Aug. 7, 1945.  P. GRELSON  2,381,740
LAWN SPRINKLER
Filed Aug. 7, 1944

Inventor
PETER GRELSON
By Carlsen + Hazle
Attorneys

Patented Aug. 7, 1945

2,381,740

UNITED STATES PATENT OFFICE 2,381,740

LAWN SPRINKLER

Peter Grelson, Minneapolis, Minn.

Application August 7, 1944, Serial No. 548,347

10 Claims. (Cl. 299—69)

This invention relates to improvements in lawn sprinklers.

The primary object is to provide a lawn sprinkler having a rotatable spray head and adapted for operation with the spray directed either horizontally or vertically. As is well known the common sprinkler, in which the spray nozzles rotate in a horizontal plane, covers a wide lawn area, but are not well adapted to sprinkling narrow lawn strips such as found between the sidewalk and street curbing and commonly called boulevards, and frequently when so used the spray falls in part upon the sidewalks and street and besides being wasted is likely to sprinkle passersby. In accordance with the primary object of my invention I provide a sprinkler wherein the spray may be turned on edge, so to speak, or caused to travel in a generally upright plane to cover a narrow and comparatively elongated strip of lawn area such as commonly found along the boulevards, thus overcoming these disadvantages of the usual sprinkler.

It is a further object of my invention to provide in connection with the sprinkler a spray shield which, when the spray is turned on edge, is used to protect the grass immediately beneath the spray head from the direct forcible impact of the downwardly directed spray and prevent erosion or washing out of the grass which otherwise might occur; such shield being, however, perforated to allow a part of the water to run through and water the turf at that point.

These and other more detailed and specific objects will be disclosed in the course of the following specification, reference being had to the accompanying drawing, in which—

Figure 1:
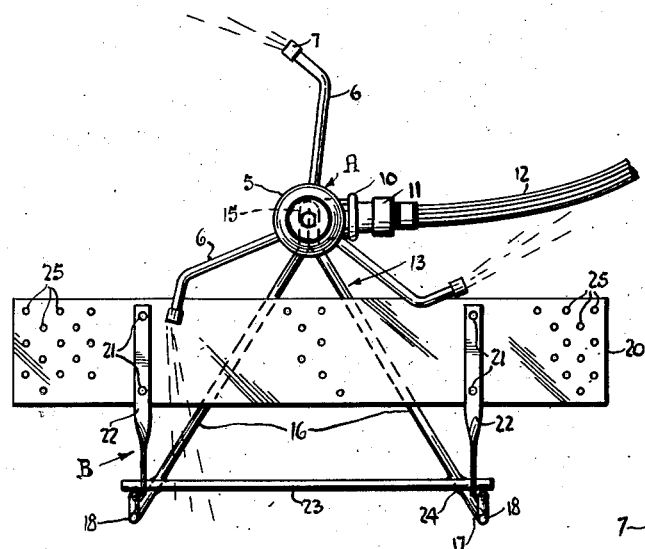
Fig. 1 is a plan view of my improved sprinkler as arranged for use in sprinkling a wide lawn area.

Referring now more particularly and by reference characters to the drawing A designates generally the spray mechanism, or the rotating spray head and nozzle assembly, and B the frame-like stand device upon which the sprinkler is mounted in accordance with my invention.

The sprinkler A comprises a rotary member 5 from which radiate three, more or less, spray tubes 6 terminating in spray nozzles 7. The member 6 is arranged, in a conventional manner, for rotation about a fitting 8 secured at the end of a pipe or nipple 9, to which is attached an elbow 10 for the reception of a coupling 11 by which the sprinkler may be connected to the usual lawn hose 12. The arrangement is obviously such that the admission of water to the sprinkler will cause sprays to be emitted from the several nozzles 7 and these nozzles are so disposed that the sprays, due to the resistance of the air, will cause the entire assembly of the member 5, tubes 6 and nozzles 7 to rotate, casting the water about a wide circular area.

The frame B as here shown comprises two main portions disposed at right angles to each other and forming what might be termed a base portion 13 and a leg or stand portion 14. These parts may be formed of a single length of heavy rod bent medially and brought together to provide a mounting shank 15, from which the respective sides of the rod angle in opposite directions forming diverging sides 16, which at equal distances from the shank 15 are turned at right angles at 17 and extended in parallelism in the form of legs 18. The shank 15 is secured rigidly to the sprinkler A as by welding the shank to the elbow 10 as indicated at 19 in Fig. 3. The diverging sides 16 now form the aforesaid base portion 13 of the frame and as seen in Fig. 1 the sprinkler as a whole may rest with these sides 16 on the ground, in which case the axis of the rotary member 5 is vertically disposed and the spray will be directed over a wide surrounding area, of equal span on all sides, about the sprinkler. The legs 18 stand up from the ground in this case but interfere in no way with operation of the sprinkler.

Figure 3:
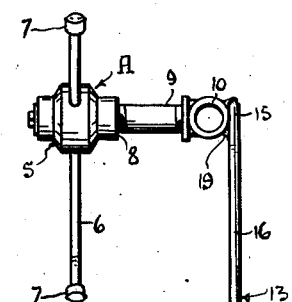
Fig. 3 is an end view of the sprinkler as shown in Fig. 2.
Figure 2:
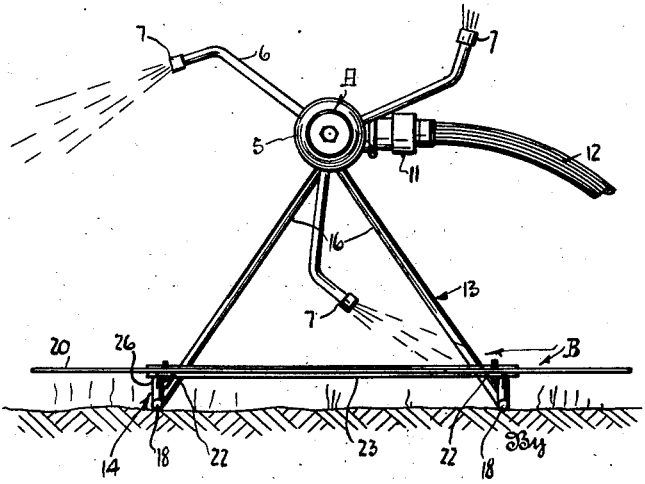
Fig. 2 is a side elevation of the sprinkler, turned on edge or positioned for sprinkling a narrow lawn strip.

Referring to Figs. 2 and 3 it will be apparent that the frame B may also be turned up to rest upon the legs 18 which then provide a wide firm bearing on the ground and support the spray head A thereabove. Now, however, the axis of the rotating head 5 is horizontally disposed with the result that the spray will be directed in a generally vertical plane, and will cover a comparatively narrow area, elongated in a plane at right angles to the said axis. When thus arranged it is shown that the sprinkler is well adapted to cover such narrow lawn areas as are usually found between the sidewalk and curb, one of which elements is indicated at C in Fig. 3, and to do this without wasting the water by spraying adjacent sidewalk or street surfaces.

When used as in Figs. 2 and 3 it will be apparent that the downwardly directed spray would beat with great force upon the lawn immediately beneath the sprinkler and to avoid erosion and injury to the lawn at this point I provide a spray shield in the form of a rectangular plate 20 which is affixed, as by rivets 21, to the ends of swingable arms 22. These arms are apertured at their opposite ends to pivotally engage a hinge rod 23 welded at 24 across the diverging sides 16 near their junctions with the legs 18. The plate 20 may thus be swung through an arc of about ninety degrees between the base and stand portions 13 and 14 of the frame B, and may be turned down over the legs 18 when the spray is operating in a vertical plane. When so positioned the plate 20 extends beneath the path of the spray nozzles 7 and parallel to their direction of travel so that the downwardly directed spray will strike the plate. The force of the spray is thus broken protecting the grass and soil beneath the plate, and at the same time adequate water will reach the grass due to the provision of a plurality of apertures 25 in the plate (Fig. 1).

As will be noted in Fig. 3 particularly the legs 18 are upwardly arched or bent at their centers 26 and the spray shield plate 20 is thus held well above the ground level preventing the grass from being matted down. At the same time the legs thus bent will more steadily support the sprinkler should the ground surface be slightly uneven. In this connection it will be apparent that the spray head A is disposed over the legs 18 so that the weight of the former will act to prevent the sprinkler from tipping over.

When the sprinkler is horizontally disposed as in Fig. 1 the spray shield plate 20 may be swung down to lie upon the sides 16 out of the way, the free edge of the plate clearing the nozzles 7 when the spray head is turned to the position indicated in this view.

It is understood that suitable modifications may be made in the structure as disclosed, provided that such modifications lie within the spirit and scope of the appended claims. Having now, therefore, fully disclosed my invention, what I claim as new and desire to secure by Letters Patent is:

1. A lawn sprinkler comprising a spray head adapted to spray water in one plane, and supporting means for the spray head and having one portion adapted to rest on the lawn and support the spray head with the spray directed in a horizontal plane and another portion adapted to support the head with the spray directed in a vertical plane.

2. In a lawn sprinkler having a rotary spray head adapted to direct a water spray outward about its axis of rotation, a supporting stand for the spray head, said stand being selectively positionable on the ground for directing the spray in a generally horizontal plane for sprinkling a wide lawn area to all sides of the sprinkler and for directing the spray in a generally vertical plane for spraying a narrow elongated lawn strip.

3. In a lawn sprinkler having a rotary spray head adapted to direct a water spray outward about its axis of rotation, a supporting stand for the spray head, said stand having a base portion adapted to support the spray head with its axis of rotation vertical and a leg portion upon which the stand may be selectively placed on edge to support the spray head with its axis of rotation horizontal.

4. In a lawn sprinkler of the character described, a rotary spray device operative to direct a water spray outward about its axis of rotation, a stand for the spray device comprising a base portion supporting said device and a leg portion disposed at right angles to said base portion, and said stand being positionable on its base and leg portions selectively to support the spray device with its axis of rotation disposed in generally vertical and horizontal planes respectively.

5. In a lawn sprinkler of the character described, a rotary spray device operative to direct a water spray outward about its axis of rotation, a stand for the spray device comprising a base portion supporting said device and a leg portion disposed at right angles to said base portion, and said stand being positionable on its base and leg portions selectively to support the spray device with its axis of rotation disposed in generally vertical and horizontal planes respectively, the said base portion of the stand being formed of diverging sides terminating in right angularly turned end portions forming the leg portion of the stand.

6. In a lawn sprinkler having a rotary spray device adapted to direct a spray outward about its axis of rotation, a stand adapted to selectively support the spray device with its rotary axis vertical for directing the spray outward over a circular lawn area and to support the spray device with said axis in a horizontal plane to direct the spray upwardly, downwardly and to each side to cover a narrow lawn strip, and means for shielding the lawn immediately beneath from the downwardly directed spray.

7. In a lawn sprinkler having a rotary spray device adapted to direct a spray outward about its axis of rotation, a stand adapted to selectively support the spray device with its rotary axis vertical for directing the spray outward over a circular lawn area and to support the spray device with said axis in a horizontal plane to direct the spray upwardly, downwardly, and to each side to cover a narrow lawn strip, and a spray shield positionable below the spray device when the rotary axis thereof is horizontal to protect the lawn from the full force of the downwardly directed spray.

8. In a lawn sprinkler, a rotary spray device adapted to direct a water spray outwardly from and around its axis of rotation, a stand comprising a base portion secured to the spray device and adapted to support the same with its axis in an upright plane, said stand also having legs extending at right angles from the base portion and upon which the stand may be rested to support the spray device with its rotary axis horizontal to thereby cause the water spray to be directed downwardly, upwardly and to each side along a narrow lawn strip, and a spray shield plate movably supported on the stand and positionable across said legs when the stand rests thereon to break the force of the downward spray and protect the lawn therefrom.

9. In a lawn sprinkler, a rotary spray device adapted to direct a water spray outwardly from and around its axis of rotation, a stand comprising a base portion secured to the spray device and adapted to support the same with its axis in an upright plane, said stand also having legs extending at right angles from the base portion and upon which the stand may be rested to support the spray device with its rotary axis horizontal to thereby cause the water spray to be directed downwardly, upwardly and to each side along a narrow lawn strip, and a spray shield plate movably supported on the stand and positionable across said legs when the stand rests thereon to break the force of the downward spray and protect the lawn therefrom, the said legs being upwardly arched to support the shield plate above the grass on the lawn.

10. In a lawn sprinkler, a rotary spray device adapted to direct a water spray outwardly from and around its axis of rotation, a stand comprising a base portion secured to the spray device and adapted to support the same with its axis in an upright plane, said stand also having legs extending at right angles from the base portion and upon which the stand may be rested to support the spray device with its rotary axis horizontal to thereby cause the water spray to be directed downwardly, upwardly and to each side along a narrow lawn strip, and a perforated spray shield plate pivotally supported adjacent the junction between the base portion and legs of the stand and swingable from an idle position on the base portion to a position below the spray device when the stand is rested upon its legs to protect the lawn from the downwardly directed spray.

PETER GRELSON.